US009721615B2

United States Patent
Bowen et al.

(10) Patent No.: US 9,721,615 B2
(45) Date of Patent: Aug. 1, 2017

(54) NON-LINEAR VIDEO REVIEW BUFFER NAVIGATION

(71) Applicant: Cisco Technology, Inc., San Jose, CA (US)

(72) Inventors: Gareth John Bowen, Chandlers Ford (GB); Avraham Poupko, Jerusalem (IL); Lawrence Sol Rublin, Beit Shemesh (IL)

(73) Assignee: Cisco Technology, Inc., San Jose, CA (US)

(*) Notice: Subject to any disclaimer, the term of this patent is extended or adjusted under 35 U.S.C. 154(b) by 331 days.

(21) Appl. No.: 14/524,027

(22) Filed: Oct. 27, 2014

(65) Prior Publication Data

US 2016/0118086 A1    Apr. 28, 2016

(51) Int. Cl.
| | |
|---|---|
| G11B 27/30 | (2006.01) |
| G11B 27/10 | (2006.01) |
| G11B 27/00 | (2006.01) |
| G11B 27/34 | (2006.01) |
| H04N 21/44 | (2011.01) |
| H04N 21/472 | (2011.01) |
| H04N 21/8549 | (2011.01) |

(52) U.S. Cl.
CPC ........ *G11B 27/3036* (2013.01); *G11B 27/005* (2013.01); *G11B 27/102* (2013.01); *G11B 27/3081* (2013.01); *G11B 27/34* (2013.01); *H04N 21/44004* (2013.01); *H04N 21/47217* (2013.01); *H04N 21/8549* (2013.01)

(58) Field of Classification Search
CPC .............. G11B 27/3036; G11B 27/102; G11B 27/3081; G11B 27/005; G11B 27/34; H04N 21/44004; H04N 21/47217
See application file for complete search history.

(56) References Cited

U.S. PATENT DOCUMENTS

| | | | |
|---|---|---|---|
| 5,602,596 | A | 2/1997 | Claussen et al. |
| 5,786,845 | A | 7/1998 | Tsuria |
| 7,043,746 | B2 | 5/2006 | Ma |
| 7,328,450 | B2 | 2/2008 | Macrae et al. |
| 7,440,674 | B2 | 10/2008 | Plotnick et al. |
| 7,779,438 | B2 | 8/2010 | Davies |
| 8,079,052 | B2 | 12/2011 | Chen et al. |
| 8,397,255 | B2 | 3/2013 | Wachtfogel et al. |
| 8,554,046 | B2 | 10/2013 | Morley et al. |
| 2009/0210899 | A1 | 8/2009 | Lawrence-Apfelbaum et al. |
| 2009/0317053 | A1* | 12/2009 | Morley ............... H04N 5/783 386/343 |
| 2010/0002082 | A1* | 1/2010 | Buehler ........... G08B 13/19693 348/159 |

(Continued)

*Primary Examiner* — Anil Bhargava
(74) *Attorney, Agent, or Firm* — Samuel M. Katz (57) ABSTRACT

In one embodiment, a method for non-linear navigation of video content includes: receiving the video content in a live video review buffer, where the video content is indexed according to a time code index, defining video content windows in the video content according to blocks of time according to the time code index, displaying a grid of video tiles, where each of the video tiles is associated with one of the video content windows in the live video review buffer, defining an in-focus status for one of the video tiles, and in response to user input, navigating the video content window associated with the video tile with the in-focus status.

20 Claims, 9 Drawing Sheets

(56) References Cited

U.S. PATENT DOCUMENTS

| | | | |
|---|---|---|---|
| 2010/0077285 A1* | 3/2010 | Bailey | G11B 27/034 |
| | | | 715/201 |
| 2011/0107220 A1* | 5/2011 | Perlman | A63F 13/12 |
| | | | 715/720 |
| 2011/0126236 A1* | 5/2011 | Arrasvuori | H04N 21/4532 |
| | | | 725/46 |
| 2011/0286721 A1* | 11/2011 | Craner | H04N 7/17309 |
| | | | 386/343 |
| 2013/0019263 A1* | 1/2013 | Ferren | G06F 13/00 |
| | | | 725/37 |
| 2014/0096021 A1 | 4/2014 | Gowen et al. | |
| 2016/0112752 A1* | 4/2016 | Selvaraj | H04N 21/4312 |
| | | | 725/41 |
| 2016/0241617 A1* | 8/2016 | Jelley | G06F 17/30017 |

* cited by examiner

NON-LINEAR VIDEO REVIEW BUFFER NAVIGATION

FIELD OF THE INVENTION

The present invention generally relates to non-linear navigation of a video review buffer.

BACKGROUND OF THE INVENTION

Live video review buffers are typically used to cache at least part of the video data stream from a current broadcast for review by a viewing user. The contents of the live video review buffer are typically navigated linearly by rewinding and/or forwarding from a current location in the buffer. Live video review buffers are commonly implemented on client devices such as set-top boxes (STBs) and/or as a network-based component, for example when streaming content using adaptive bit rate (ABR).

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method for non-linear navigation of video content includes: receiving the video content in a live video review buffer, where the video content is indexed according to a time code index, defining video content windows in the video content according to blocks of time according to the time code index, displaying a grid of video tiles, where each of the video tiles is associated with one of the video content windows in the live video review buffer, defining an in-focus status for one of the video tiles, and in response to user input, navigating the video content window associated with the video tile with the in-focus status.

Description

Rewind/forward functionality may typically be used to navigate through a live video review buffer linearly in order to locate a specific point to begin playback. It will be appreciated that using standard playback speed to rewind/forward may be tedious for a user. Using fast rewind/forward may result in over/undershooting the desired point, leading to repeated cycles by the user viewing a few seconds of video content and then progressively narrowing the range of rewind/forward "jumps" until the desired point is ultimately located.

Figure 1:
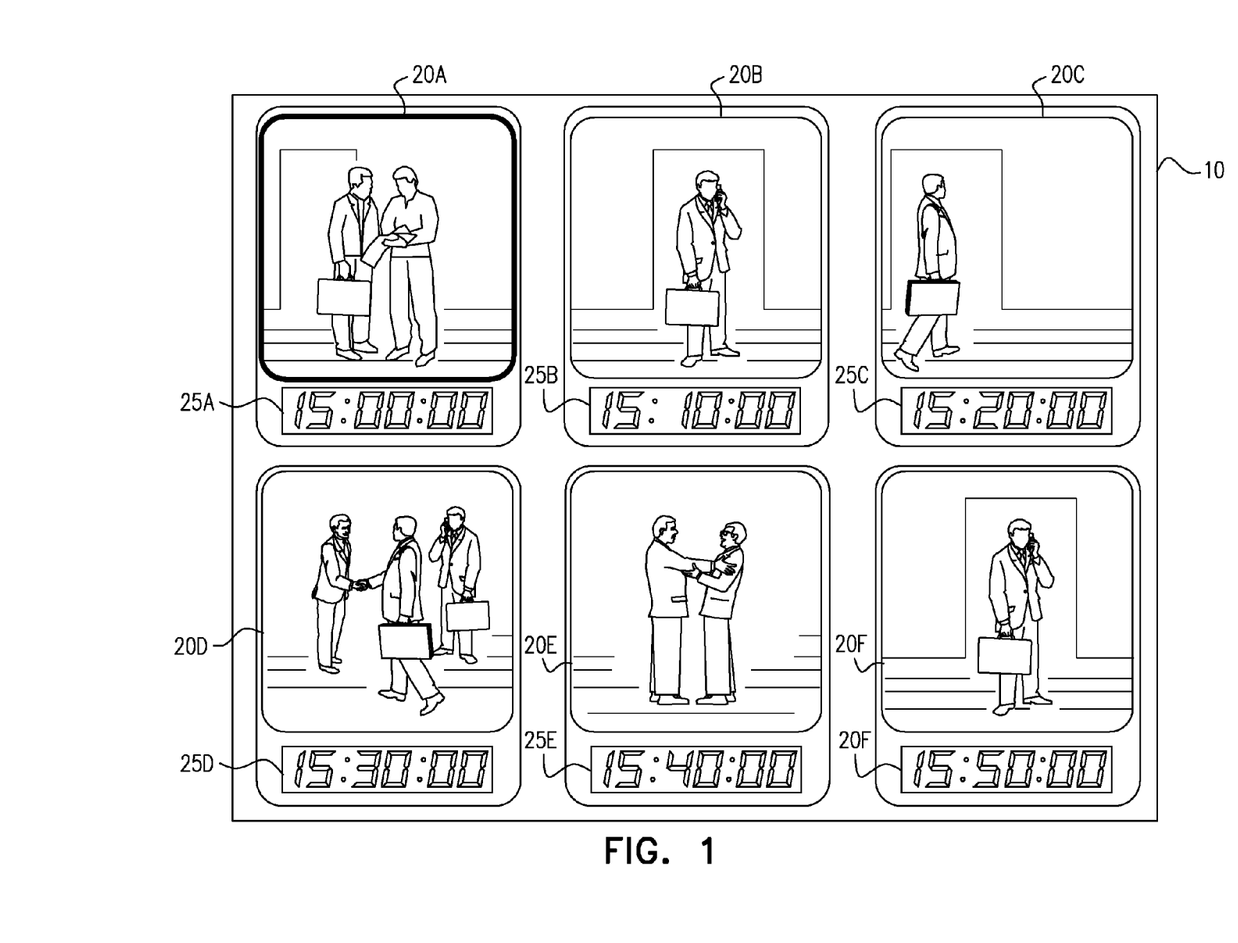
FIG. 1 is a simplified pictorial illustration of an exemplary video tile grid user interface screen, constructed and operative in accordance with an embodiment of the present invention.

The inventors of the present invention have realized that a non-linear presentation of the contents of a live video review buffer may provide an easier to use mechanism for locating a desired point in the buffered video content. Reference is now made to FIG. 1 which is an illustration of an exemplary video tile grid user interface (UI) screen 10, constructed and operative in accordance with an embodiment of the present invention. Video tile grid UI screen 10 may be configured to be accessed by a user in order to navigate a live video review buffer in a non-linear manner.

Video tile grid UI screen 10 comprises a grid of video tiles 20, where video tiles 20A-C are displayed in a first row, and video tiles 20D-F are displayed in a second row. It will be appreciated that the depiction of the grid in a 3×2 format is exemplary; the present invention may support other formats as well, such as, for example, 3×3, 4×2, 4×3, etc. Each video tile 20 may comprise a corresponding time code 25, such that video tile 20A comprises video time code 25A; video tile 20B comprises video time code 25B, and so on. It will be appreciated that the depiction of video time codes 25 may be exemplary, in some embodiments of the present invention video time codes 25 may not be explicitly displayed. Alternatively, the display or non-display of video time codes 25 may be configurable.

Each video tile 20 may depict a first image from a video content window, i.e. a block of time representing a portion of the video content in the live video review buffer. Video time codes 25 may represent a timestamp for the start of the video content window represented by each video tile 20. The base time for the timestamp may be configurable. For example, it may be based on the actual start time of a broadcast of the video content in the live video review buffer. Alternatively, the base time may be set to 00:00 when the live video review buffer begins to receive a video data stream. Alternatively, or in addition, the base time may be set by a user of video tile grid UI screen 10.

In accordance with embodiments of the present invention, the video content in the live video review buffer may be indexed at least according to a broadcast time code, thereby facilitating the division of the contents of the live video review buffer according to broadcast time. For example, the video content in the live video review buffer may have been broadcast using a known method for ABR which includes such indexing. The present invention may leverage this characteristic of ABR broadcasts in order to present video tiles 20 according to video time codes 25. It will, however, be appreciated by one of skill in the art that the present invention may support any time code indexing. Such indexing may also be added to an existing method in order to support the present invention.

In an exemplary embodiment of the present invention, the live video review buffer may comprise one hour of video content from a current broadcast, such that each video tile 20 may represent a ten minute video content window. For example, the current time may be 16:00:00. Video tile 20A may therefore comprise ten minutes of video content that was broadcast starting at 15:00:00 (as per video time code 25A); video tile 20B may comprise ten minutes of video content that was broadcast starting at 15:10:00 (as per video time code 25B); video tile 20C may comprise ten minutes of video content that was broadcast starting at 15:20:00 (as per video time code 25C); and so on.

As depicted in FIG. 1, the border of video tile 20A may be bolded to indicate that video tile 20A is in focus for the viewing user, i.e. that the user may input actions relevant to video tile 20A. It will be appreciated that the use of a bolded border may be exemplary; the present invention may support the use of other conventions to indicate which video tile 20 is in focus. The viewing user may use known controls and methods to navigate the video content window represented by each video tile 20. For example, the viewing user may use a set-top box remote control. Accordingly, as per the scenario presented in FIG. 1, the user may select to play or fast forward through the video content associated with video tile 20A. Alternatively, the viewer may move the focus to another video tile 20 before playing or fast forwarding through the associated video content.

In accordance with some embodiments of the present invention, the video content may begin playing when a video tile 20 is determined to be in focus for the viewing user. Alternatively, the video tracks may be played for all or some of video tiles 20, and the audio track may be played as well for the video tile 20 in focus. It will be appreciated that in view of possible hardware/software constraints on video content playing device 100, such playing of video content for either the in-focus video tile 20 and/or the other video tiles 20 may entail a lower quality version of the video content. For example, in order to minimize the use of resources for simultaneous decoding of multiple video streams, some video frames may be skipped during play.

Figure 2:
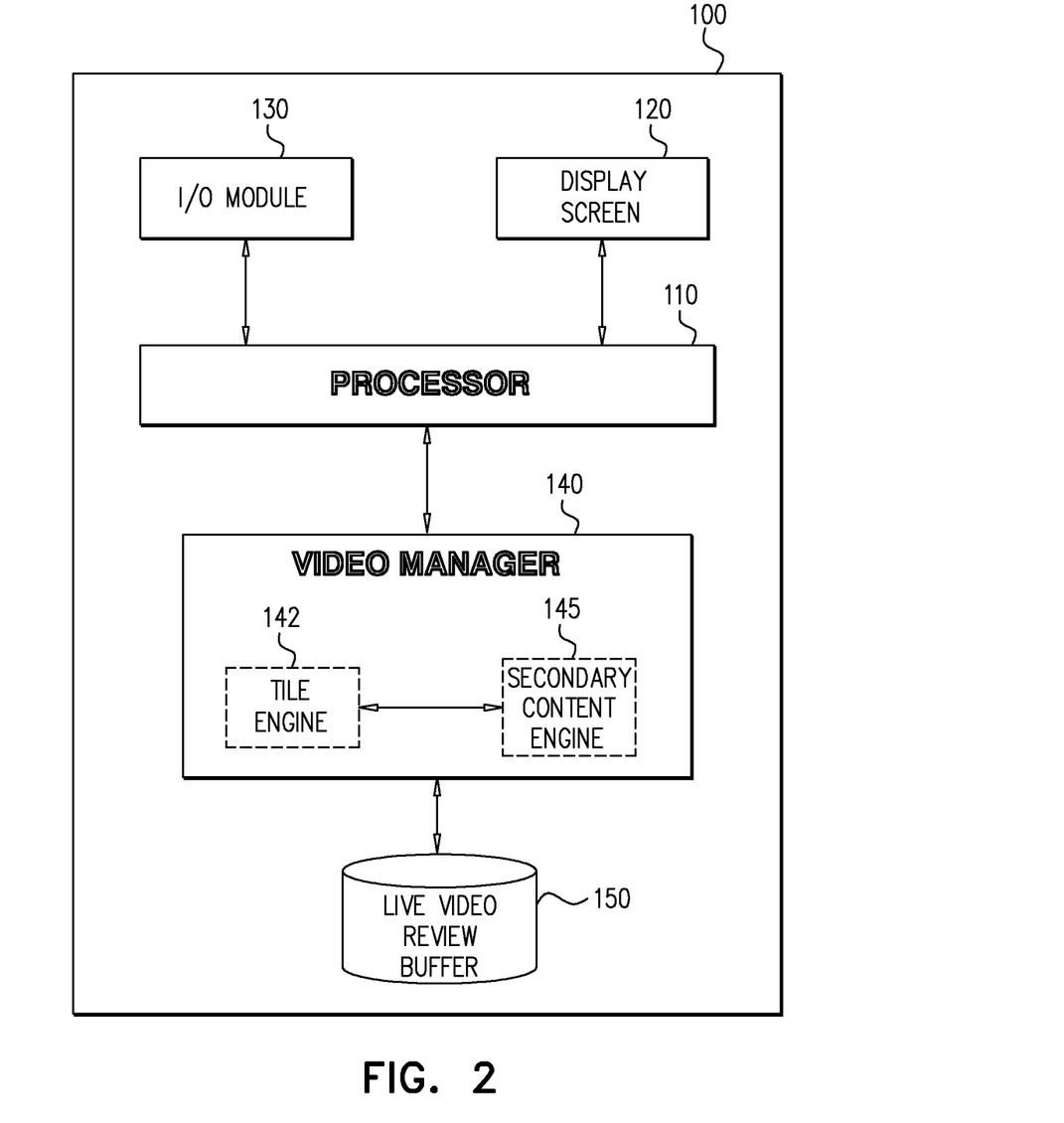
FIG. 2 is a schematic illustration of an exemplary video content playing device, operative to present and process the user interface of FIG. 1.

Reference is now made to FIG. 2 which is a schematic illustration of an exemplary video content playing device 100, operative to present and process video tile grid UI screen 10. In accordance with an exemplary embodiment of the present invention, video content playing device 100 may be implemented as a set-top box device. However, it will be appreciated that video content playing device 100 may be implemented using any suitable computing device, such as, for example, a personal computer, tablet computer, smartphone or laptop computer. Video content playing device 100 comprises processor 110, display screen 120, I/O module 130, video manager 140, and live video review buffer 150.

It will be appreciated that the depiction of display screen 120, video manager 140 and live video review buffer 150 as integrated components of video content playing device 100 may be exemplary. In some embodiments of the present invention, the functionalities of display screen 120, video manager 140, and live video review buffer 150 may be implemented as independent components accessed by video content playing device 100. For example, display screen 120 may be implemented as a television on which video content received via I/O module 130 is played. Similarly, video content playing device 100 may be configured to present video tile grid UI screen 10 on a companion device (e.g. a smartphone, tablet computer, laptop computer, etc.) while the in-focus video tile 20 may be presented on an associated screen such as, for example, a television screen or a computer monitor. Furthermore, in some embodiments of the present invention, some or all of the components of video content playing device 100 may be cloud based and accessible via a communications network such as, for example, a LAN, WAN or the Internet. It will also be appreciated that live video review buffer 150 may be operative to cache at least part of the video data stream from a current broadcast, regardless of whether or not the underlying video content is associated with a live event at the time of broadcast. In this context, the video content may be also considered "live" even if it was recorded at an earlier time, as long as it is provided as part of a current broadcast stream.

Video content playing device 100 comprises hardware and software components, such as are well-known in the art. It will be appreciated that video content playing device 100 may comprise more than one processor 110. For example, one such processor 110 may be a special purpose processor operative to at least present video tile grid UI screen 10 on display screen 120 according to a method described herein. In some of the embodiments described hereinbelow, display screen 120 may be a touchscreen operative to detect user interface (UI) gestures input as commands to an operating system and/or application running on video content playing device 100. Such UI gestures are typically entered by one or more of the user's fingers or suitable implement such as a pen or stylus coming in contact or at least close proximity with display screen 120. Processor 110 may be operative to execute instructions stored in a memory (not shown). I/O module 130 may be any suitable hardware and/or software component operative to use protocols such as are known in the art to receive and/or send video content and associated commands and/or instructions.

Video manager 140 may be a software application that may be executed by processor 110 in order to at least perform the herein described method to present video tile grid UI screen 10. Alternatively, video manager 140 may be implemented as a hardware component. Video manager 140 may comprise tile engine 142 and secondary content engine 145. As will be described hereinbelow, video manager 140 may use tile engine 142 and/or secondary content engine 145 to configure portions of video tile grid UI screen 10 for display and operation. It will be appreciated that video manager 140 may comprise other functionality such as is known in the art for playing video content.

Figure 3:
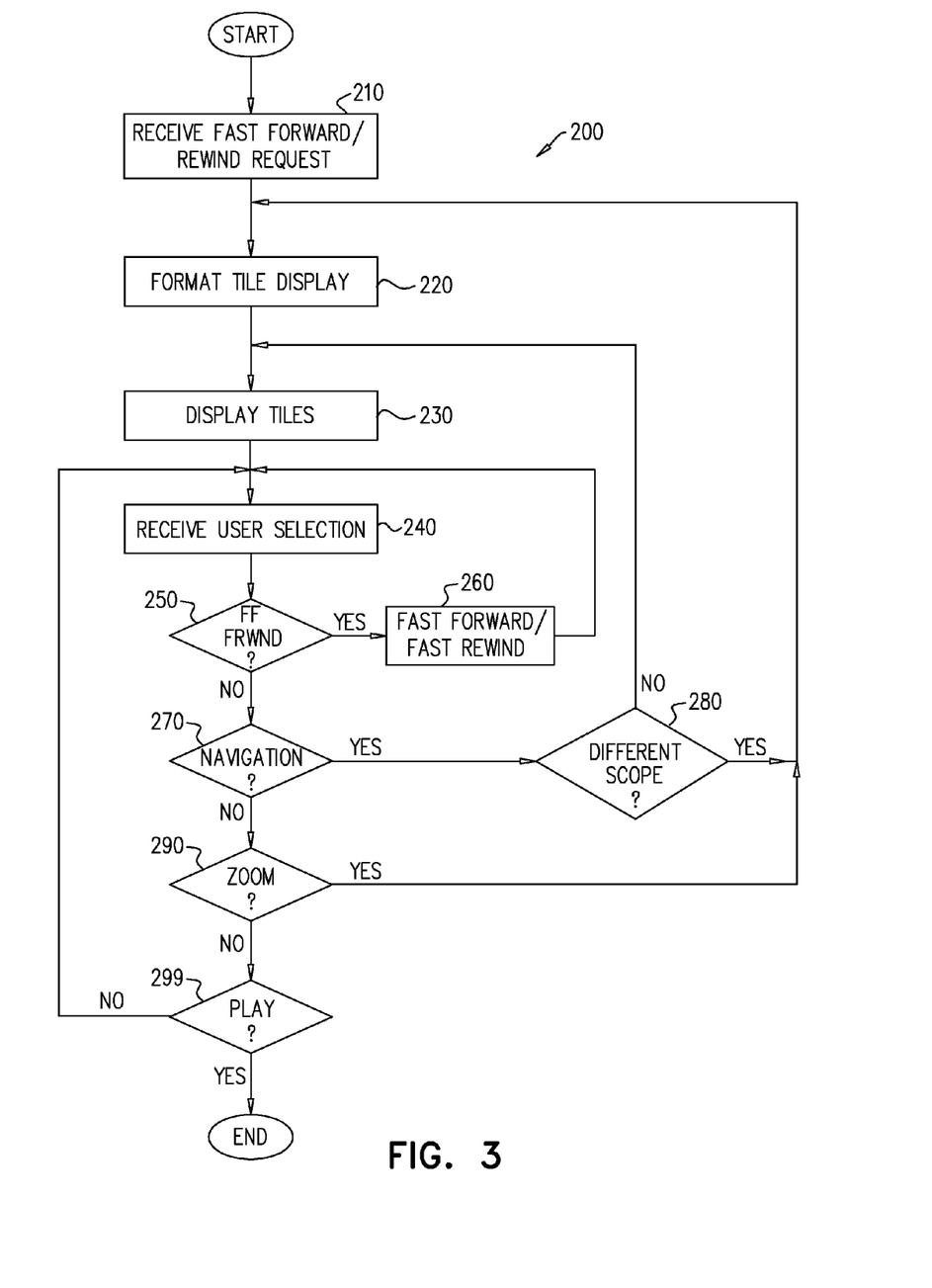
FIG. 3 is a block diagram of a non-linear video review buffer navigation to be performed by the video manager of FIG. 2 in order to present the exemplary video tile grid user interface screen of FIG. 1.

Reference is now made to FIG. 3 which illustrates a video tile display process 200 to be performed by video manager 140 (FIG. 2) in accordance with embodiments of the present invention. Video manager 140 may receive (step 210) a viewer's request to fast forward or fast rewind within live video review buffer 150. The user may use any suitable method or mechanism to input the request and/or other inputs to be processed by process 200. For example, a set-top box remote control may be used. In such a case, one or more of the buttons on the remote control may be programmed to send the request. It will be appreciated that device 100 may be configured to receive input from other input devices such as, for example, a companion device, a mouse, a pointing device, a keyboard or voice commands.

In response to such a request, video manager 140 may format (step 220) the contents of video tiles 20 and display (step 230) video tiles 20, for example, as shown in FIG. 1.

Video manager 140 may receive (step 240) a user selection to be processed. If the user selection is a fast forward or fast rewind command (step 250), video manager 140 may process the command for the video content in the video tile 20 in focus. It will be appreciated that such a command may be to either start, stop, or change the speed of either the fast forwarding or the fast rewinding. For example, in FIG. 1, video tile 20A is depicted as being in focus. Video manager 140 may receive a command to start fast forwarding and begin fast forwarding the video content in video tile 20A. Control may then return to step 240 to receive additional input from the user. A stop fast forwarding command may subsequently be received in step 240, and in response video manager 140 may stop the fast forwarding that was previously started in step 260. It will be appreciated that step 250 may also be configured to enable the user to step through the associated video content in a frame-by-frame progression. For example, a single press of the user selection control may be interpreted as a request to perform frame-by-frame stepping. A double press or a long press may be interpreted as a request to perform fast forwarding/rewinding as described hereinabove.

It will be appreciated that video tile grid UI screen 10 may only provide navigation of available video content within the video content window associated with a given video tile 20. Fast forward/rewind and/or frame-by-frame commands may not be used to exceed the bounds of a video content window. For example, process 200 may not facilitate a rewind command to a point before the start of the video content window, nor may it facilitate forwarding past the end of the video content window.

Figure 4:
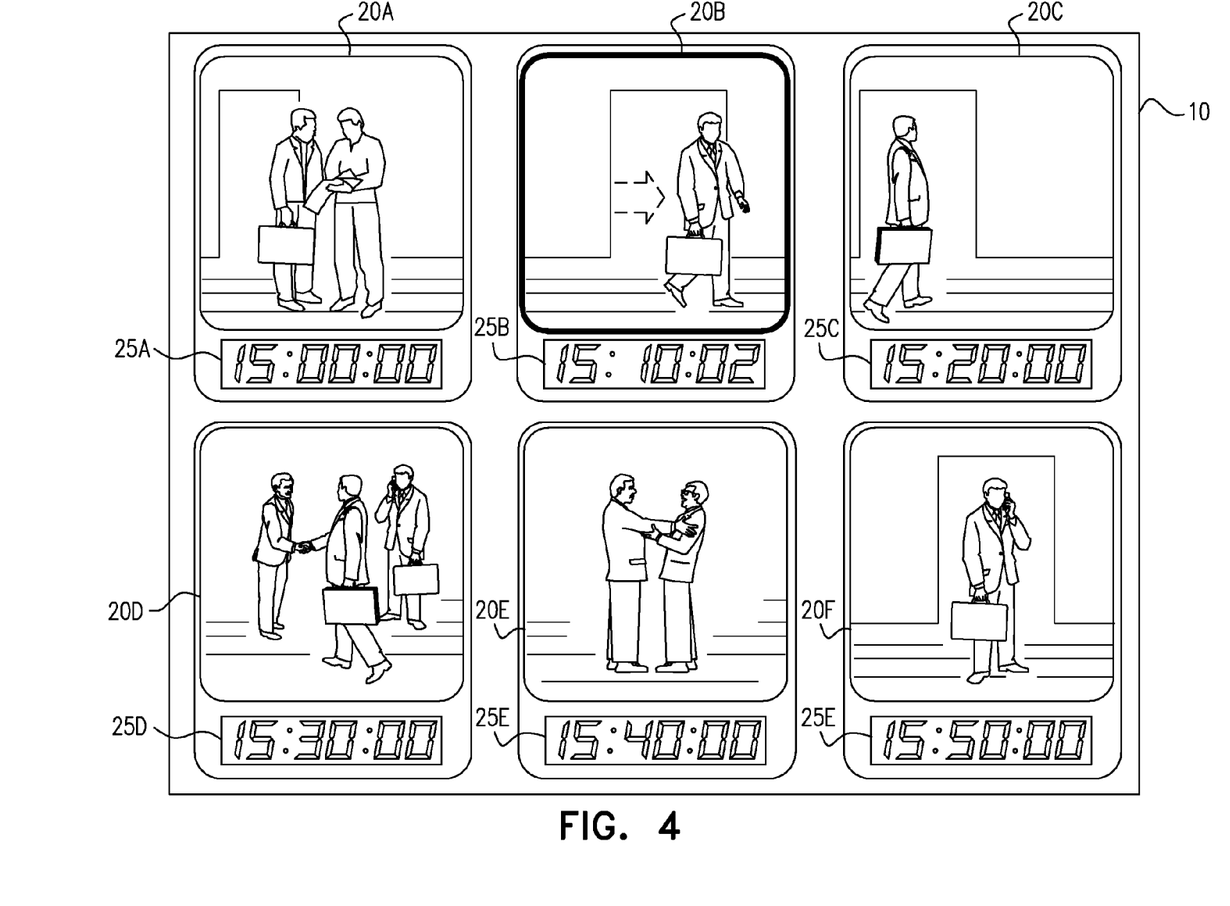
FIGS. 4-7 and 9 are simplified pictorial illustrations of exemplary video tile grid user interface screens as processed by the process of FIG. 3.

If the received user selection is not a fast forward / fast rewind command, process 200 may determine whether the user selection is a navigation command (step 270), i.e. a request to change the video tile 20 in focus. Such a command may be entered by a user on a remote control using arrow keys and/or a dedicated key, such as, for example, a "next" key. Reference is now also made to FIG. 4 which illustrates an additional view of the exemplary video tile grid UI screen 10 of FIG. 1 as it may be processed by process 200. If the navigation command does not change the display scope (step 280), i.e. the change of focus is to another video tile 20 already displayed in video tile grid UI screen 10, control may return to step 230. As shown in FIG. 4, the focus may have changed from video tile 20A to video tile 20B.

It will be appreciated that a navigation command may result in changing the scope of video tile grid UI screen 10. For example, if video tile 20F is currently in focus, a "next" command may effectively change the focus to a non-displayed video tile 20 as the logically next video tile 20 is not included in the display. If the navigation command thereby changes the scope of screen 10 (step 280), control may return to step 220 to reformat the display of video tiles 20 in accordance with the new scope.

FIG. 4 also shows an exemplary result of a fast forward command that may have been received subsequent to the change of focus to video tile 20B. As indicated by the dashed arrow, a fast forward command may have been received in step 240. As indicated by video time code 25B, the video content in video tile 20B may have advanced two seconds, i.e. from 15:10:00 as depicted in FIGS. 1, to 15:10:02 as depicted in FIG. 4.

Figure 5:
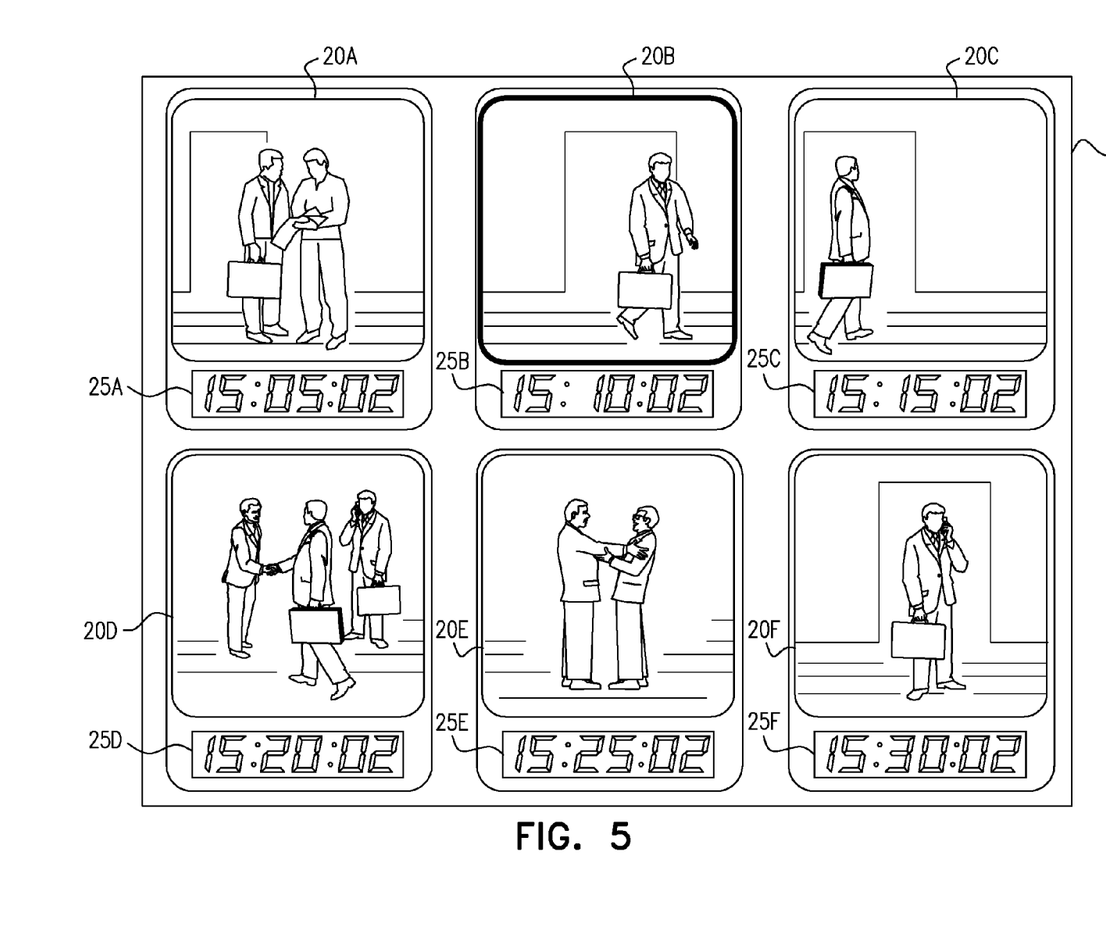

In accordance with some embodiments of the present invention, a step forward/backward or fast forward/fast rewind command may be applied to multiple video tiles 20. For example, as shown in FIG. 5, to which reference is now also made, the video content in each video tile 20 may advance in parallel with the video content in the video tile 20 in focus, either in a frame-by-frame step progression, or using fast forwarding/rewinding as known in the art. Accordingly, as indicated by the associated video time codes 25, the video content in video tile 20A may advance to 15:00:02; the video content in video tile 20C may advance to 15:20:02; the video content in video tile 20D may advance to 15:30:02; the video content in video tile 20E may advance to 15:40:02; and video tile 20F may advance to 15:50:02.

It will be appreciated that there are limits to the amount of video content that live video review buffer 150 may hold. Accordingly, video manager 140 may be configured to redefine the scope for each video tile 20, i.e. to redefine the start/end times of the video content window for each video tile 20. Therefore video tile grid UI screen 10 may be configured to enable the user to select to redefine the scope of video tiles 20. For example, the user may request to redefine the scope of each video tile 20 according to a current location in the video content window associated with the video tile 20 in focus. Using FIG. 5 as an example of such a request, the start time of the video content window for each video tile 20 may be shifted as an offset from the current location in video tile 20B (i.e. the video tile 20 in focus). Accordingly, the video content window associated with video tile 20B may be shifted to start at 15:10:02. The video content window for video tile 20A may be shifted similarly to start at 15:00:02; the video content window for video tile 20C may be shifted to start at 15:20:02, and so on. It will however, be appreciated that the length of the video content windows, i.e. ten minutes as per the example of FIG. 5, may remain constant. It will similarly be appreciated that such shifts may be constrained by the availability of video content in live video review buffer 150.

Alternatively, or in addition, video manager 140 (FIG. 2) may comprise a timer function (not shown) that may be used by video manager 140 to detect when the video content associated with one or more video tiles 20 may no longer be available in live video review buffer 150. In such a case, video manager 140 may autonomously redefine the scope for video tiles 20 without proactive user selection.

Alternatively, or in addition, video tile grid UI screen 10 may also be configured to enable the user to elect to "zoom" in or out, effectively decreasing or increasing the amount of video content in each video tile 20. If the user selection is a zoom command (step 290), control may return to step 220 to reformat the display of video tiles 20 in accordance with a new scope as indicated by the zoom command. For example, as shown in FIG. 5, a zoom command may be interpreted by video manager 140 as a request to change the video content window associated with each video tile 20 from ten minutes to five minutes. In step 220, video manager 140 may reformat video tile grid UI screen 10 such that each video tile 20 references a video content window of only five minutes. Video tile 20A may therefore start at five minutes earlier than the current position in the video tile 20 in focus, i.e. at 15:05:02 as per a five minute offset from video time code 25B. Video tile 20C may start five minutes after video tile 20B, i.e. at 15:10:02. Each of video tiles 20D-F may start at five minute increments thereafter.

Returning to FIG. 3, if the user selection indicates a play option (step 299), video manager 140 may initiate the playing of the video content per the current point in time displayed in the video tile 20 currently in focus. Video tile grid UI screen 10 may be replaced on display screen 120 by a full-screen presentation of the video content as it plays. It will be appreciated that video manager 140 may process other user selections using standard functionalities commonly available in set-top boxes. It will also be appreciated by those of skill in the art that the order of the steps of process 200 may be exemplary; other processing flows providing generally the same functionality may also be supported by the present invention. Particularly, steps 250, 270, 290 and 299 may be re-ordered within the scope of the present invention. It will similarly be appreciated by those of skill in the art that, depending upon the configuration of video manager 140, successive executions of steps 220 and/or 230 may be based on previous execution of the same steps, such that a subsequent execution of a step may entail updating or modifying previous results without necessarily performing the step in its entirety.

It will be appreciated that a typical broadcast data stream may not be comprised entirely of "primary video content". Primary video content may be, for example, a television program, a movie, or live event provided by a broadcaster. The typical broadcast stream may also comprise "secondary video content" such as, for example, news items, public service announcements, commercial advertisements. Broadcasts of live sports events typically comprise additional secondary video content such as, for example, pre-game shows, halftime shows, post-game shows and/or recorded highlights from other games.

Viewers may have different priorities for viewing secondary video content as opposed to primary video content. For example, some viewers may prefer to use fast forward functionality to avoid viewing secondary video content that may be interspersed among primary video content in a live video review buffer. Other viewers may actually be more interested in the secondary video content than the primary video content. For example, some sports fans may actually prefer viewing the "condensed action" of secondary video content such as recorded highlights as opposed to watching an entire live sports event from start to finish. Similarly, some viewers may prefer to view secondary video content such as commercial advertisements; whereas other viewers may wish to skip commercial advertisements.

Providers of playback systems have addressed these priorities and preferences primarily in the context of commercial advertisements. Some playback systems provide full fast forward functionality without regard to whether or not the video content has advertisements. In some playback systems, such functionality may be selectively disabled when fast forwarding/rewinding through commercial advertisements in the video content, thereby preventing a user from skipping over commercial advertisements without playing them at regular speed. In other playback systems, fast forwarding/rewinding may be disabled for the first x seconds of a commercial advertisement and then re-enabled, thereby allowing the user to continue fast forwarding/rewinding after the first x seconds of the commercial are played.

Figure 6:
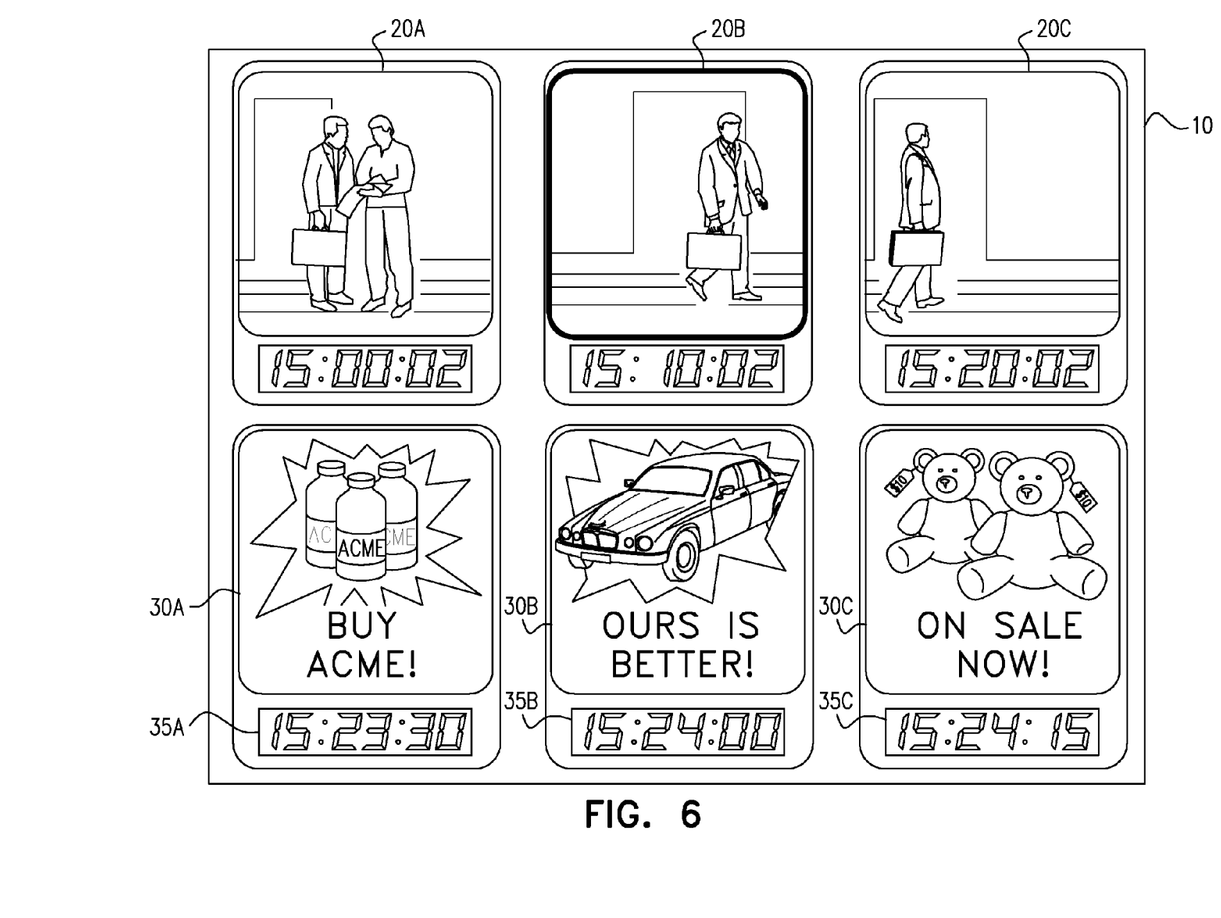

The inventors of the present invention have realized that the non-linear presentation of video tile grid UI screen 10 may be leveraged to unobtrusively surface secondary video content during fast forward/fast rewind operations, i.e. to present secondary video content to the user without overly impacting the viewing experience. Reference is now made to FIG. 6 which illustrates another view of the exemplary video tile grid UI screen 10 of FIG. 4. In accordance with embodiments of the present invention, some or all of the video content windows associated with video tiles 20 of FIGS. 1 and 4 may be defined in terms of secondary video content included within the video content in live video review buffer 150.

For example, primary video tiles 20A-B of FIG. 6 may be navigation tiles similar to similarly numbered video tiles 20A-B in FIG. 4, each with a video content window of ten minutes of primary video content, hereinafter referred to as a primary video content window. Primary video tile 20A may extend from 15:00:02 to 15:10:02, and video tile 20B may extend from 15:10:02 to 15:20:02. However, within the ten minute primary video content window nominally associated with video tile 20C, there may be one or more secondary video content items. Video manager 140 may be configured to detect metadata that may indicate the location of secondary video content within the video content in live video review buffer 150. When a secondary video content items is detected, the primary video content window of the associated primary video tile 20 (i.e. video tile 20C) may be truncated, and the video content window for the next navigation tile (herein denoted as secondary video content tile 30A) may be defined according to the length of the detected secondary video content item.

Secondary video content tiles 30 are associated with secondary video content items and may comprise a display associated with the secondary video content. For example, the display may be of the first image in the secondary video content item. Alternatively, or in addition, the display may be of a textual slogan associated with the secondary video content. Video manager 140 may superimpose the slogan on the display of the first image. Alternatively, video manager 140 may display the image and the slogan, each on a different dedicated portion of secondary video content tile 30. Alternatively, video manager 140 may briefly display the image and the slogan one after the other in a continuous loop. Alternatively, or in addition, video manager 140 may play the video tracks or, depending on the capabilities and/or configuration of device 100, at least a subset of the video frames of the secondary video content in secondary video content tile 30. The subset to be played may be generated as a function of a "frame decimation" process whereby a percentage of the frames are skipped. Alternatively, or in addition, the subset may be defined as a segment of the original secondary video content, e.g. the last five seconds of a twenty second secondary video content item. The subset may also be generated using both methods to produce a frame decimated version of a shortened advertisement.

Alternatively, or in addition, when a given video tile 30 with a commercial advertisement is in focus, video manager 140 may play the entire secondary video content, including the audio tracks. Alternatively, or in addition, the metadata for the secondary video content may comprise a URL according to which video manager 140 may display/play a slogan, image, or video sequence from the referenced location. For example, the display may be of a downloaded image presenting an image and/or message related to, but not necessarily expressly included in, the secondary video content. For example, to indicate a recorded sports highlight, the image or message may comprise a static picture, such as a JPEG or PNG image of a key player featured in the recorded sports highlight, and downloaded in accordance with the URL. It will be appreciated that similar to the discussion hereinabove; a slogan may also be presented in various combinations with externally sourced images and video sequences.

Accordingly, in the exemplary embodiment of FIG. 6 there may be a thirty second secondary video content item at 15:23:30 of live video review buffer 150. The primary video content window for video tile 20C may therefore be truncated at 15:23:30 as indicated by video time code 35A. The secondary video content window for secondary video content tile 30A may correspond to the length of the secondary video content item, i.e. thirty seconds. Accordingly, as per video time code 35B, the secondary video content window associated with secondary video content tile 30B may begin thirty seconds later at 15:24:00. As indicated by video time code 35C, the secondary video content window for secondary video content tile 30C may correspond to a fifteen second secondary video content item that may start immediately after the secondary video content items of secondary video content tile 30B. The secondary video content window for secondary video content tile 30C may therefore start at 15:24:15.

Figure 7:
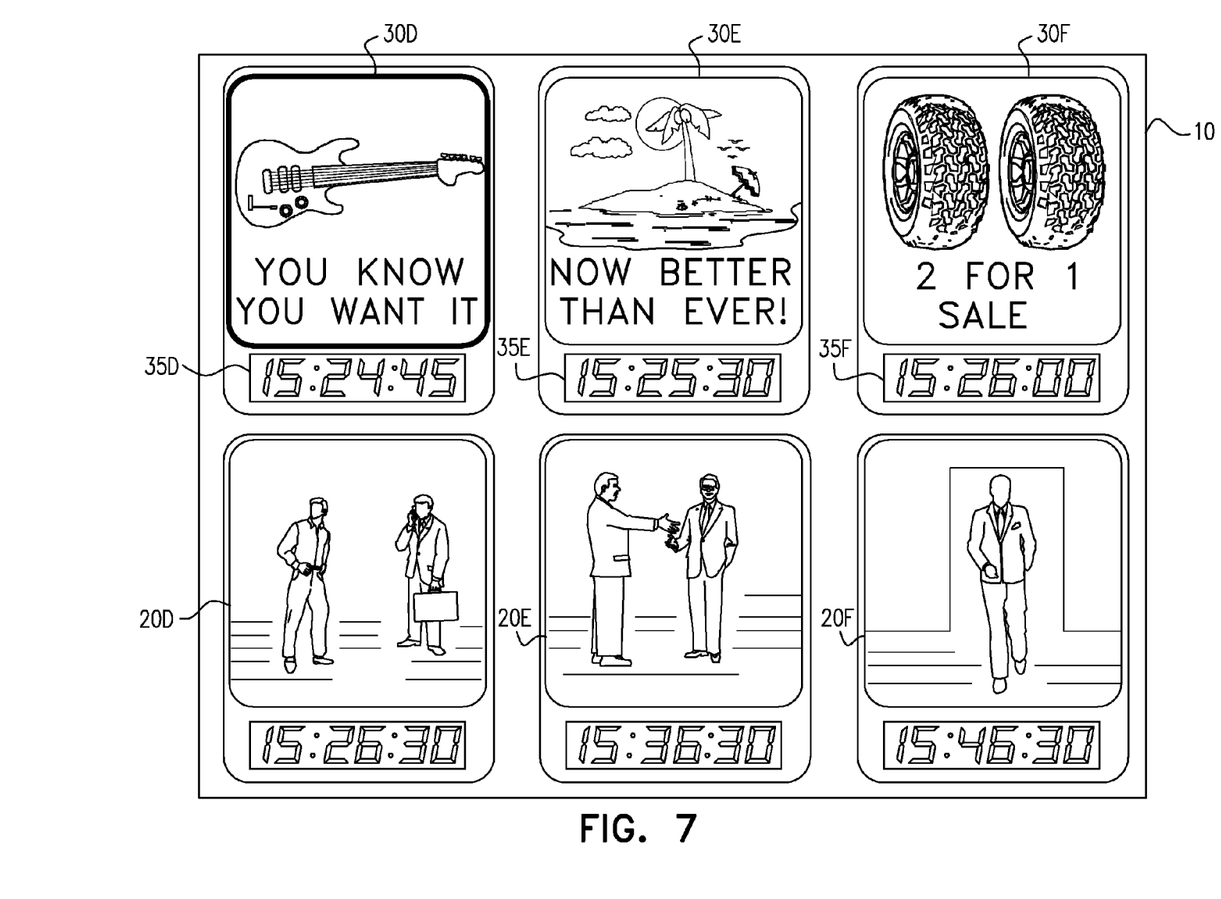

Reference is now made to FIG. 7 which illustrates a next exemplary video tile grid UI screen 10 that may be accessed from the video tile grid UI screen 10 of FIG. 6 as described hereinabove with reference to steps 270 and 280. Video tile grid UI screen 10 comprises three additional secondary video content tiles 30 (i.e. secondary video content tiles 30D-F) as well as primary video content tiles 20D-F. It will be appreciated that the length of each secondary video content window for secondary video content tiles 30D-F may be a function of the length of the associated secondary video content items, whereas the primary video content windows for primary video tiles 20D-F may be of a standard length as per the current scope or "zoom level", i.e. ten minutes as per the exemplary embodiment.

Figure 8:
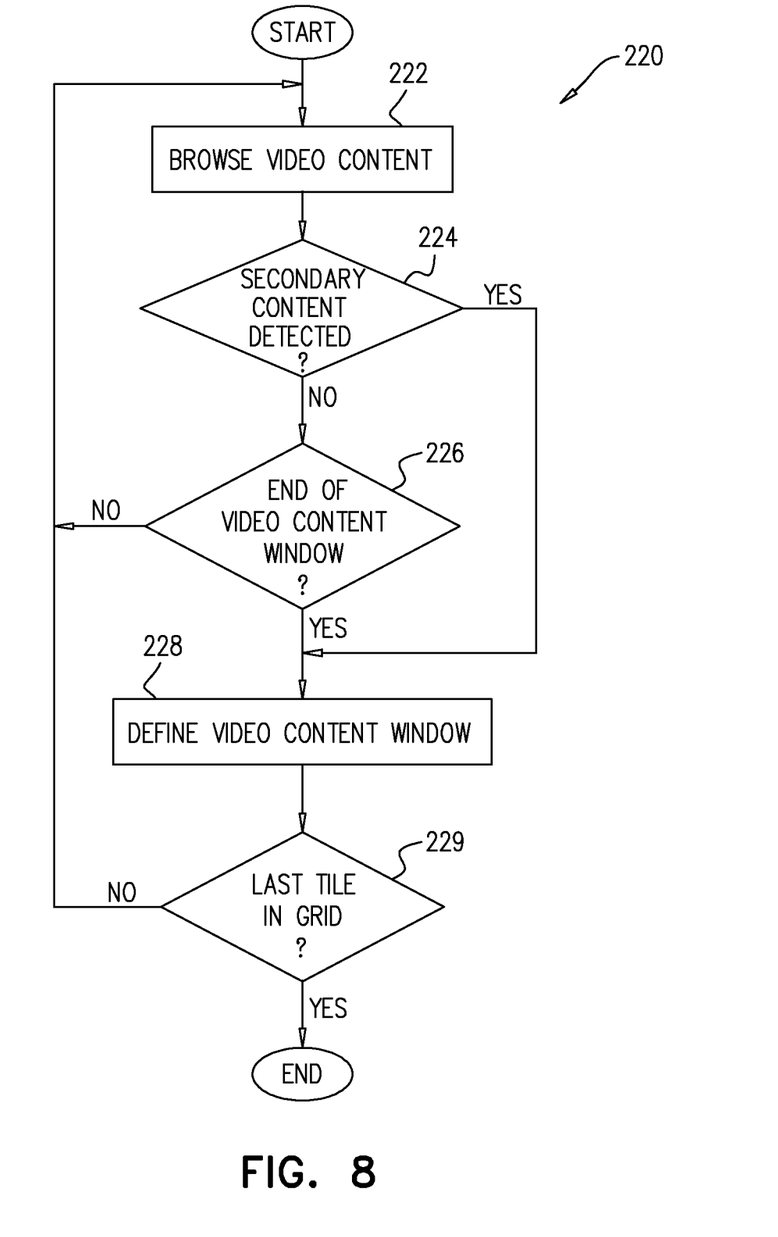
FIG. 8 is a block diagram of an expanded process for a step in the process of FIG. 3.

It will therefore be appreciated that the formatting of the video tile display in step 220 may comprise additional steps in order to account for the possible presence of secondary video content in the video content. Reference is now made to FIG. 8 which illustrates an exemplary tile formatting process 220 that may be integrated as step 220 of process 200.

Video manager 140 may browse (step 222) the video content and/or associated indexing metadata in live video review buffer 150. Video manager 140 may invoke secondary content engine 145 (FIG. 1) to determine if the video content is associated with a commercial advertisement. It will be appreciated that any suitable means may be used to make such a determination. For example, secondary content engine 145 may detect metadata such as, for example, SCTE-35 signaling, added to the video content that may indicate that the presence of a secondary video content item.

If secondary content engine 145 detects a secondary video content item (step 224) the control flow may continue to step 228. Otherwise, video manager 140 may invoke tile engine 142 to determine whether or not the browsed content represents the end of the current primary video content window. If the browsed video content represents the end of a standard length primary video content window (step 226), i.e. ten minutes as per the exemplary embodiment in FIGS. 6 and 7, control may flow to step 228. Otherwise, control may return to step 222.

Video manager 140 may define (step 228) a primary video content window or a secondary video content window for a video tile 20 or secondary video content tile 30 according to either the length of the detected secondary video content item, or a subset of the secondary video content item, or per a standard length, depending on the process flow executed before step 228. If this definition represents the last navigation tile to be determined for video tile grid UI screen 10, process 220 may end. Otherwise, control may return to step 222.

It will be appreciated that steps 250, 270, 290 and 299 may also be applied to secondary video content tiles 30 in generally the same manner that they may be applied to primary video tiles 20. Accordingly, it is may be up to the viewing user to decide whether or not to actually play the associated secondary video content item. However, it will also be appreciated that while video tile grid UI screen 10 does enable the viewing user to skip over secondary video content with relative ease, the presence of secondary video content tiles 30 in video tile grid UI screen 10 may still provide a brief opportunity to unobtrusively surface a secondary video content item in front of the viewing user.

Accordingly, it will be appreciated that video manager 140 may be configured to perform a method including: defining a multiplicity of primary video content windows according to blocks of time for buffered video content in a live review buffer, where the buffered video content includes primary video content and secondary video content, detecting at least one secondary video content item in at least one of the primary video content windows, truncating the at least one primary video content window at the detected secondary video content item, defining at least one secondary video content window in the live video review buffer according to the at least one detected secondary video content item, associating primary video content tiles with the primary video content windows, associating at least one secondary video content tile with the at least one secondary video content item, displaying a grid of content navigation tiles, where each of the content navigation tiles is either a primary video content tile or a secondary video content tile, defining an in-focus status for one of said content navigation tiles, in response to user input, navigating said video content window or said secondary video content window associated with said content navigation tile with said in-focus status.

In accordance with some embodiments of the present invention, video manager 140 may play the video and/or audio tracks of a secondary video content item when its associated secondary video content tile 30 is in focus.

Figure 9:
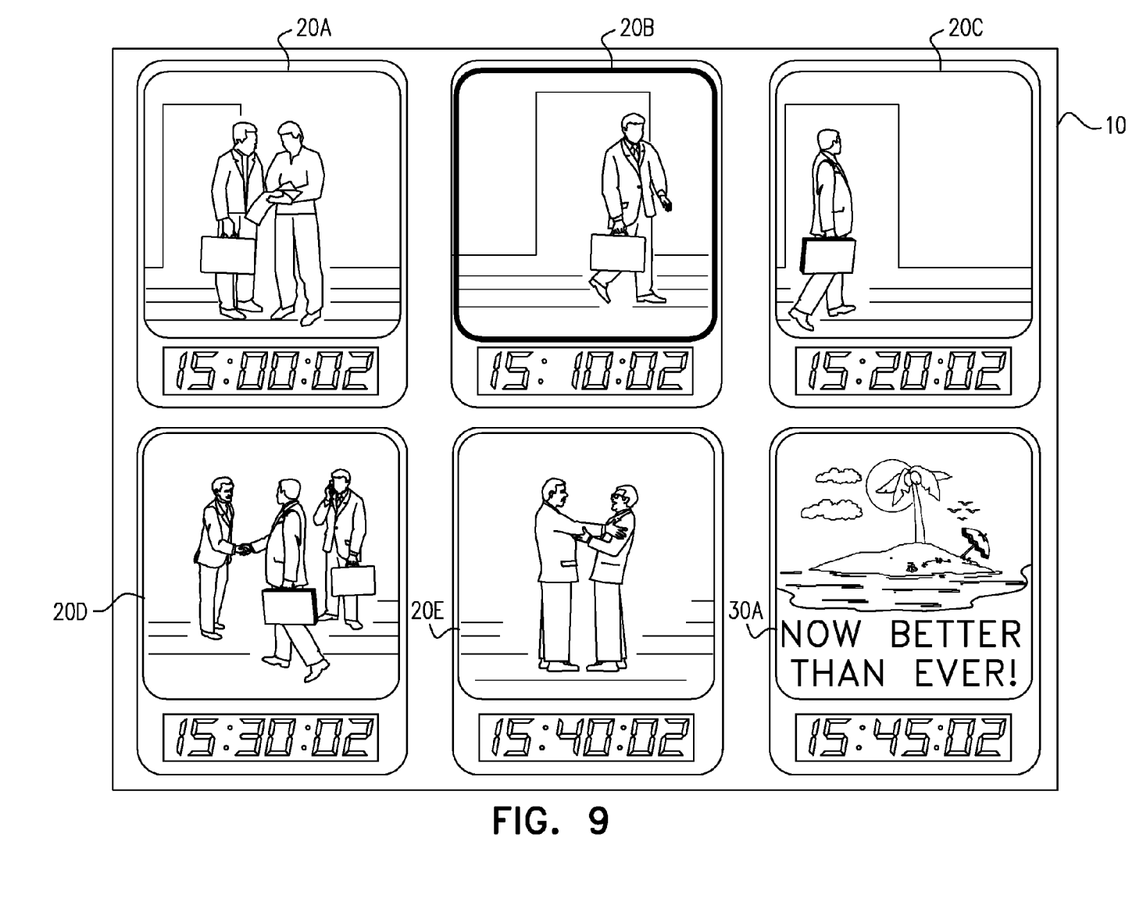

Alternatively, video manager 140 may be configured to define a single secondary video content tile 30 for a sequence of multiple secondary video content items. Reference is now made to FIG. 9, which illustrates another exemplary video tile grid UI screen 10, constructed and operative in accordance with embodiments of the present invention. Video tiles 20A-D may represent primary video tiles with standard length primary video content windows, i.e. ten minutes. The primary video content window for video tile 20E may have been truncated after five minutes by the detection of a secondary video content as described hereinabove.

Secondary video content tile 30A may represent a sequence of secondary video content items that begin at 15:45:02 as per FIG. 9. It will be appreciated, however, that the display for secondary video content tile 30A may not necessarily be associated with the first secondary video content item in the sequence. For example, the image and slogan displayed in secondary video content tile 30A may be associated with the fifth secondary video content item in a sequence of six secondary video content items as per the embodiments of FIGS. 6 and 7. The remaining five secondary video content items may be surfaced and associated with individual secondary video content tiles 30 in response to a zoom command as per step 290.

Video manager 140 may be configured to randomly surface one of the secondary video content items in a detected sequence of secondary video content. Alternatively, or in addition, the individual secondary video content items may be prioritized based on considerations by the broadcaster. Alternatively, or in addition, priority may be granted based on the length of a secondary video content item or the frequency in which it appears in the video content.

Alternatively, or in addition, priority may be granted based on a user profile determined by either user preferences and/or history. For example, the viewing user may input a set of preferences for determining what kind of secondary video content may be surfaced by video manager 140. Alternatively, or in addition, video manager 140 may be configured to track which, if any, secondary video content items are played most often by the viewing user and assign priority to secondary video content items with similar characteristics.

Alternatively, or in addition, video manager 140 may display a sequence of images, slogans and/or videos in secondary video content tile 30A, where each successive image, slogan and/or video is associated with a different secondary video content item in the detected sequence of secondary video content.

It will be appreciated that the use of video tile grid UI screen 10 may not necessarily be limited to the navigation of video content in a live video review buffer; other implementations may be supported by the present invention. For example, video tile grid UI screen 10 may be used to navigate VOD (video on demand) content. The video content may be divided into primary video content windows and presented using associated primary video tiles 20 in generally the same manner as described hereinabove. One or more secondary video content tiles 30 may also be included in video tile grid UI screen 10 to present one or more secondary video content items packaged with the VOD content using generally similar methods as those discussed hereinabove with respect to FIGS. 6-9. It will similarly be appreciated that video tile grid UI screen 10 may also be used in a similar manner as a navigation interface for video content provided on any computer-readable medium, such as, for example, a CD, DVD, disk-on-key, and the like.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for non-linear navigation of video content on a video content playing device, the method comprising:
    receiving a video content item in a live video review buffer, wherein said video content item is indexed according to a time code index;
    defining video content windows in said video content item according to said time code index, wherein said video content windows are defined as blocks of time in said video content item, and said blocks of time are of a same length of time;
    displaying a grid of video tiles, wherein each of said video tiles is associated with one of said video content windows in said live video review buffer;
    defining an in-focus status for one of said video tiles; and
    in response to user input, navigating said video content window associated with said video tile with said in-focus status.

2. The method according to claim 1 and wherein said displaying comprises displaying an image from a current position in said video content window on its associated said video tile.

3. The method according to claim 1 and wherein said displaying comprises displaying for each said video tile a video time code indicating a current location for said associated video content window.

4. The method according to claim 1 and also comprising:
    receiving a user request to change said in-focus status; and
    in accordance with said user request, defining said in-focus status for another of said video tiles.

5. The method according to claim 1 and also comprising:
    receiving a user request to resize said blocks of time;
    in accordance with said user request, resizing said blocks of time; and
    performing said displaying.

6. The method according to claim 1 and wherein said navigating comprises:
    fast forwarding/rewinding through said video content window associated with said video tile with said in-focus status in focus.

7. The method according to claim 1 and wherein said navigating comprises:
    stepping forward/backward on a frame-by-frame basis through said video content window associated with said video tile the with said in-focus status.

8. The method according to claim 1 and wherein said navigating is performed in parallel for each said video content window associated with said video tiles in said grid of video tiles.

9. The method according to claim 1 and wherein said displaying comprises playing video tracks of said video content window associated with said video tile with in-focus status.

10. The method according to claim 1 and also comprising playing audio tracks of said video content window associated with said video tile with in-focus status.

11. The method according to claim 1 and also comprising:
    detecting secondary video content in at least one said video content window;
    truncating said at least one video content window with said detected secondary content;
    defining at least one of said video content windows in which said secondary video content was detected according to at least said secondary video content; and
    defining said video tile associated with said video content window in which said secondary video content was detected as a secondary video content tile, wherein said displaying comprises displaying at least one said secondary video content tile in said grid of video tiles.

12. A method implemented on a video content playing device, the method comprising:
    defining a multiplicity of primary video content windows according to blocks of time, wherein said blocks of time are of a same length of time for buffered video content from a video content item in a live video review buffer, and wherein said buffered video content comprises primary video content and secondary video content;
    detecting at least one secondary video content item in at least one of said primary video content windows;
    truncating said at least one primary video content window at said detected secondary video content item;
    defining at least one secondary video content window in said live video review buffer according to said at least one detected item of secondary video content;
    associating primary video content tiles with said primary video content windows;
    associating at least one secondary video content tile with said at least one secondary video content item;
    displaying a grid of content navigation tiles, wherein each of said content navigation tiles is either a primary video content tile or a secondary video content tile;
    defining an in-focus status for one of said content navigation tiles; and
    in response to user input, navigating said video content window or said secondary video content window associated with said content navigation tile with said in-focus status.

13. The method according to claim 12 and wherein said displaying comprises: displaying a textual slogan associated with said secondary video content in said secondary video content tile.

14. The method according to claim 12 and wherein said displaying comprises: displaying an image associated with said secondary video content in said secondary video content tile.

15. The method according to claim 12 and also comprising;
- accessing additional video content according to a link provided in metadata of said buffered video content; and
- displaying at least said additional video content associated with said secondary video content in said secondary video content tile, wherein said additional video content is accessed according to said link in said metadata.

16. The method according to claim 13 and also comprising superimposing said textual slogan over at least one image associated with said secondary video content.

17. The method according to claim 12 and wherein said displaying comprises: playing additional video content associated with said secondary video content in a loop in said secondary video content tile.

18. The method according to claim 12 and said displaying comprises displaying at least a message associated with one of at least two said segments of secondary video content, wherein said secondary video content window comprises said at least two said segments of secondary video content.

19. The method according to claim 18 and also comprising determining said message to be displayed based on user selected preferences.

20. The method according to claim 19 and also comprising determining said message to be displayed based on a user viewing history.

* * * * *

UNITED STATES PATENT AND TRADEMARK OFFICE
CERTIFICATE OF CORRECTION

| | | |
|---|---|---|
| PATENT NO. | : 9,721,615 B2 | |
| APPLICATION NO. | : 14/524027 | |
| DATED | : August 1, 2017 | |
| INVENTOR(S) | : Gareth John Bowen et al. | |

It is certified that error appears in the above-identified patent and that said Letters Patent is hereby corrected as shown below:

In the Claims

Column 12, Line 14 approx., Claim 7, "tile the with" to read as --tile with--.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*